United States Patent [19]
Yashnov et al.

[11] Patent Number: 5,847,493
[45] Date of Patent: Dec. 8, 1998

[54] HALL EFFECT PLASMA ACCELERATOR

[75] Inventors: Y M Yashnov; V A Petrosov; V I Baranov; A I Vasin, all of Moscow, Russian Federation

[73] Assignee: Space Power, Inc., San Jose, Calif.

[21] Appl. No.: 761,948

[22] Filed: Dec. 9, 1996

[30] Foreign Application Priority Data

Apr. 1, 1996 [RU] Russian Federation ............. 96105557

[51] Int. Cl.⁶ .................................................. H01J 1/52
[52] U.S. Cl. .................. 315/231.31; 313/359.1; 313/361.1; 313/362.1
[58] Field of Search ............................ 313/231.31, 359.1, 313/361.1, 362.1; 315/111.41, 111.61

[56] References Cited

U.S. PATENT DOCUMENTS 5,359,258 10/1994 Arkhipov et al. .................... 314/359.1
5,475,354 12/1995 Valentian et al. .................... 313/359.1
5,581,155 12/1996 Morozov et al. .................. 315/111.21

*Primary Examiner*—Sandra L. O'Shea
*Assistant Examiner*—Vip Patel
*Attorney, Agent, or Firm*—Fliesler, Dubb, Meyer & Lovejoy

[57] ABSTRACT

A Hall effect plasma accelerator comprises an annular accelerating channel. A radial magnetic field is applied across the channel between magnetic poles of opposite polarity. Instead of these magnetic poles being linked by magnetic material extending around the closed end of the channel so as to form a single magnet, the invention proposes that the magnetic poles be defined on bodies of material which are magnetically separate. This allows the designer to have greater freedom in selecting the dimensions of the thruster in general and of the magnetic system in particular, thereby giving an opportunity to improve thruster efficiency and to manufacture thrusters having a wide variety of different shapes depending on available space.

13 Claims, 3 Drawing Sheets

HALL EFFECT PLASMA ACCELERATOR

FIELD OF INVENTION

This invention relates to a Hall effect plasma accelerator, sometimes known as a closed electron drift accelerator. The invention arose when considering the design of such accelerators for use as thrusters on satellites or other spacecraft. However, it is also applicable to accelerators intended for other uses, for example plasma etching and machining workpieces in a vacuum.

BACKGROUND OF INVENTION

A conventional Hall effect thruster comprises an annular accelerating channel extending circumferentially around an axis of the thruster and also extending in an axial direction from a closed end to an open end. An anode is located, usually at the closed end of the channel, and a cathode is positioned outside the channel close to its open end. Means is provided for introducing a propellant, for example xenon gas, into the channel and this is often done through passages formed in the anode itself or close to the anode. A magnetic system applies a magnetic field in the radial direction across the channel and this causes electrons emitted from the cathode to move circumferentially around the channel. Some but not all of the electrons emitted from the cathode pass into the channel and are attracted towards the anode. The radial magnetic field deflects the electrons in a circumferential direction so that they move in a spiral trajectory, accumulating energy as they gradually drift towards the anode. In a region close to the anode the electrons collide with atoms of the propellant, causing ionization. The resulting positively charged ions are accelerated by the electric field towards the open end of the channel, from which they are expelled at great velocity, thereby producing the desired thrust. Because the ions have a much greater mass than the electrons, they are not so readily influenced by the magnetic field and their direction of acceleration is therefore primarily axial rather than circumferential with respect to the channel are neutralized by those electrons from the cathode that do not pass into the channel.

In this specification the terms "upstream" and "downstream" will be used for convenience to describe directions with reference to the movement of ions in the channel.

Conventionally, the required radial magnetic field has been applied across the channel using an electromagnet having a yoke of magnetic material which defines poles on opposite sides of the channel, i.e. one radially inwardly with respect to the channel and the other radially outwardly with respect to the channel. An example is shown in European patent specification 0 463 408 which shows a magnetic yoke having a single cylindrical portion passing through the middle of the annular channel and carrying a single magnetizing coil; and a number of outer cylindrical members spaced around the outside of the accelerating channel and carrying their own outer coils. The inner and outer cylindrical members are bolted to a magnetic back plate so as to form a single magnetic yoke.

Considerable theoretical study has been performed on the best distribution of magnetic field inside the accelerating channel of Hall effect accelerators. For example, reference is made to a paper by A N Bishaev and V Kim entitled "Local Plasma Properties in a Full-Current Accelerator with an Extended Acceleration Zone", published by Soviet Physics Technical Physics 23(9), Sep. 1978. Another relevant paper is by V N Gavryushin and V Kim entitled "Effect of the Characteristics of a Magnetic Field on the Parameters of an Ion Current at the Output of an Accelerator with Closed Electron Drift", published in Soviet Physics Technical Physics 26(4), April 1981. Another relevant paper is by A I Morozov, Yew V Esipchuk, A N Kapulkin, V A Nevrovskii, and V A Smirnov, published in the Zhurnal Tekhnicheskoi Fiziki vol. 42 no. 3. One conclusion reached in these theoretical studies is that it is desirable to minimize the magnetic fie it is desirable to maximize the magnetic field gradient in an accelerating region close to the open end of the accelerating channel. To achieve this effect, Hall effect plasma accelerators have been manufactured in such a way as to incorporate magnetic screens to the inside and outside of the annular channel in the region of the anode. These magnetic screens are normally formed by cylindrical walls extending from the back plate referred to earlier. The use of such magnetic screens is described in European patent specification 0 541 309.

The requirement to achieve the optimum distribution of magnetic field within the channel and the need to keep the weight of the accelerator to a minimum have hitherto placed severe restrictions on the relative dimensions of the accelerator, in particular the ratio of its diameter to its length in the axial direction.

SUMMARY OF INVENTION

This invention provides a Hall effect accelerator in which magnetic bodies defining poles on opposite sides of the channel are substantially separate.

It has been found that by using separate magnetic bodies, in accordance with the invention, it is possible to achieve a satisfactory, or even improved performance, using a wide variety of relative dimensions in particular the length in the axial direction relative to diameter of the accelerating channel.

The inner magnetic body is preferably spool-shaped, having: a central core extending in the axial direction; an end-piece at a downstream end of the central core and extending radially outwards towards the channel to form a first magnetic pole; and a second end-piece at the upstream end of the central core extending radially outwardly and axially downstream so as to form a second magnetic pole located axially between the ends of the inner magnetic body. The aforementioned second end-piece, because it extends in the axial direction towards the first end-piece, can be considered to act as a magnetic screen and serves to create an area in the region of the anode where there is little or no magnetic field, this being required in order to provide the optimum efficiency.

The outer magnetic body preferably has a generally cylindrical wall of magnetic material, a first end-piece extending radially inwardly so as to form a magnetic pole opposite the first magnetic pole of the inner magnetic body; and a second end-piece at its upstream end extending radially inwardly and then turned back so as to extend in an axial downstream direction, terminating in another magnetic pole. This part of the end-piece extending in the axial direction likewise serves as a magnetic screen to reduce the magnetic field in the area of the anode.

Although it would be possible for the aforementioned magnetic bodies to be permanently magnetized, it is preferable to include separate sources of magnetic field (hereinafter called "magnetic sources"). These magnetic sources can be coils i.e. electromagnets. Alternatively, permanent magnets may be extended around the central core of the inner magnetic body, being partially enclosed between the central core and an axially extending "screen" portion of the second end-piece. The outer magnetic body preferably has, associated with it, a second magnetic source, coaxial with the axis of the accelerator partially enclosed between the cylindrical wall and the associated "screen".

BRIEF DESCRIPTION OF THE DRAWINGS

One way of performing the invention will now be described with reference to the accompanying drawings in which.

BEST MODE FOR CARRYING OUT INVENTION

Figure 1:
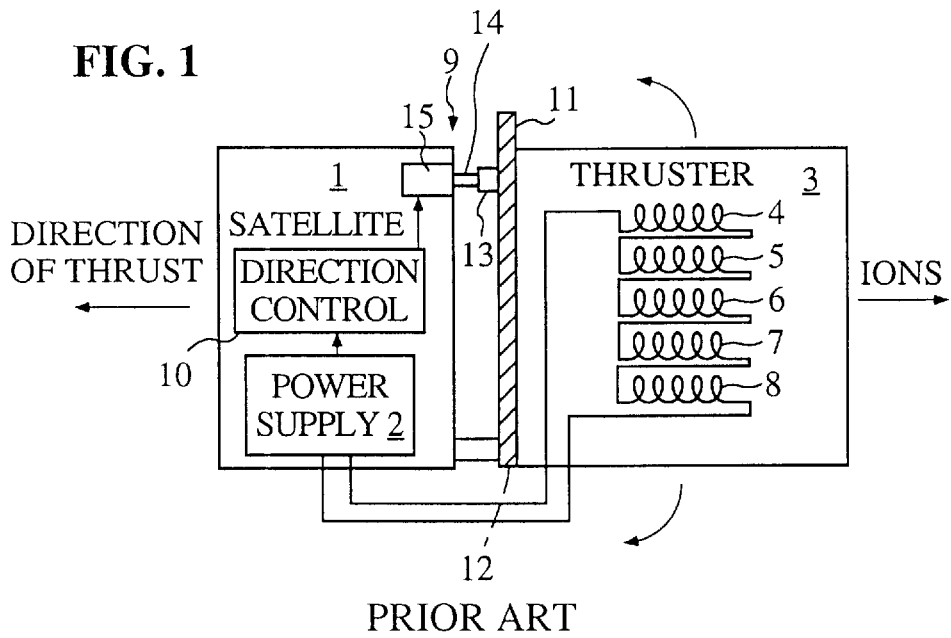
FIG. 1 illustrates, in schematic form, a known technique for steering satellites.

Referring firstly to FIG. 1, this shows, in very schematic form, a known arrangement in which a satellite 1, containing a power supply 2, is propelled by means of a plasma thruster 3. The thruster 3 contains an inner magnetic coil 4 and four outer magnetic coils 5, 6, 7 and 8 connected in series with the power supply 2 so as to receive equal constant currents. The thruster 3 can be adjusted mechanically by a swivel mechanism 9 under the control of a direction control circuit 10. The swivel mechanism comprises a platform 11 hinged at 12 to the satellite and at 13 to a driven shaft 14 of an actuator 15.

Figure 2:
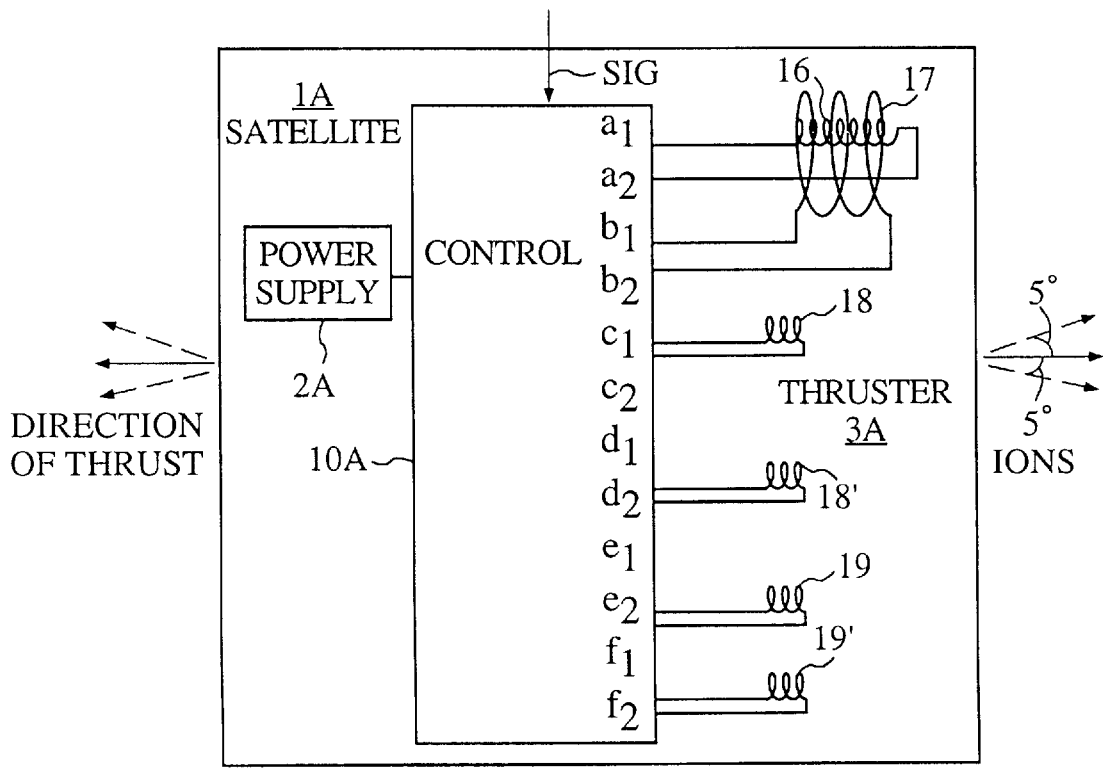
FIG. 2 is an illustration similar to FIG. 1, but showing schematically a satellite arranged to be steered using a technique in accordance with the invention.

An arrangement constructed in accordance with the invention is shown in FIG. 2, also very schematically, and comprises a satellite 1A having a thruster 3A connected rigidly to it; i.e. without the interposition of a swivel mechanism. The thruster 3A has an inner coil 16, an outer coil 17 and four ancillary steering coils 18, 18', 19, 19'. A satellite power supply 2A is connected to a control circuit 10A which receives a direction signal SIG (e.g. from an earth station via a radio link) defining a desired direction of thrust. The circuit 10A has twelve output lines arranged in pairs a1, a2; b1, b2; c1, c2; d1, d2; e1, e2; and f1, f2 and can apply a selected voltage of either polarity at each pair of outputs. The voltage a applied across a1 and a2 is constant, as is the voltage b applied across b1 and b2. The voltage c across c1 and c2 is of approximately the same value as the voltage d across d1 and d2 though there may be a small offset between these values to correct for any misalignment that might otherwise exist between the axis of the thrust vector and the physical axis of the thruster; or to deliberately create such misalignment. The he connections to the corresponding coils 18, 18' and are selected by the circuit 10A so as to ensure that current flows in opposite directions through coils 18, 18', thereby controlling the direction of thrust in one plane. Voltages e and f are varied in the same way as (but independently of) voltages c and d so as to control the currents through coils 19, 19' and thus the direction of thrust in an orthogonal plane. In this way the direction of thrust can be adjusted through a total angle of up to 10 degrees in each plane as indicated in broken lines.

Figure 3:
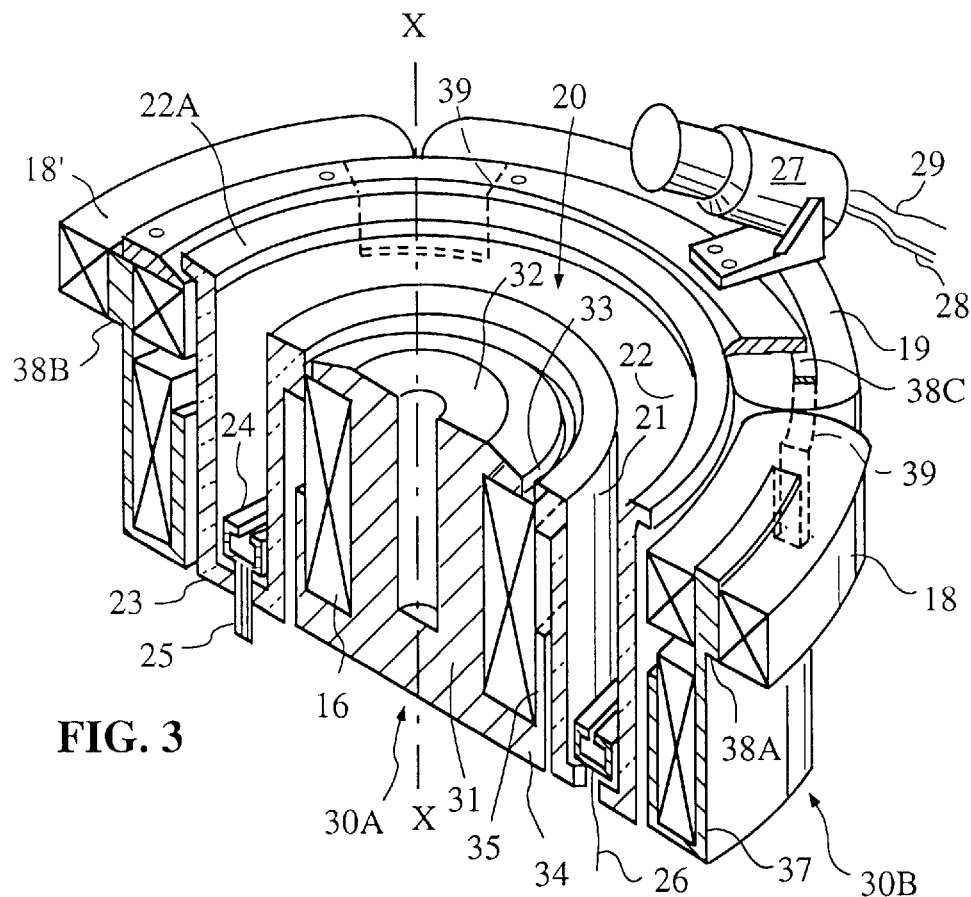
FIG. 3 is a perspective view of a stationary Hall effect plasma thruster constructed in accordance with the invention and illustrated as if cut through its diameter to reveal features of internal construction.
Figure 4:
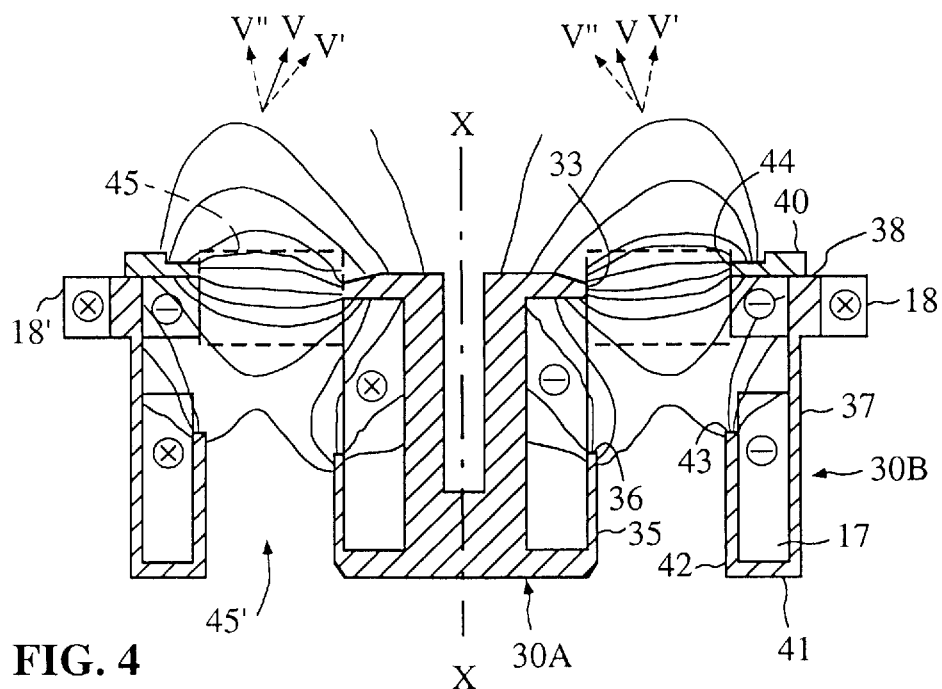
FIG. 4 is a cross-section through the axis X—X of FIG. 3 showing the magnetic components only and lines of magnetic force.

Referring now to FIGS. 3 and 4, the thruster is generally symmetrical about an axis X—X. It comprises an annular accelerating channel 20 defined between inner and outer walls 21, 22 respectively of a ceramic insert 23. The channel 20 extends from a closed, upstream end (the bottom as shown on FIG. 3) to an open, downstream end where the outer wall 22 extends in the downstream direction slightly further than the inner wall 21. Both inner and outer walls 21 and 22 are of increased thickness at their respective downstream ends and the outer wall 22 is chamfered at 22A so as to provide a slightly flared open end of the channel.

At the upstream end of the channel there is located a circular anode 24 in the form of a hollow square section tube having a groove extending continuously around it. A pipe 25 delivers a propellant (which is xenon gas in this particular example but could alternatively be krypton or argon) into this hollow anode from which it is delivered to the channel 20 through the circular groove. Baffles (not shown) may be supplied inside the anode in order to improve distribution of the propellant gas around the channel. An electrical connection 26 supplies positive potential to the anode.

A cathode 27 is mounted on a magnetic north pole, to be described later, close to the downstream end of the channel 20. This cathode is supplied with xenon gas through a connection 28 and with a source of negative potential via electrical connector 29. The magnetic system includes two magnetically separate bodies or yokes, namely an inner yoke 30A and an outer yoke 30B, both made of magnetically permeable material.

The inner yoke 30A is in the shape of a spool and has a central cylindrical core part 31 having a central bore for the purposes of weight reduction. An inner coil 16 is wound around this cylindrical part so that current passes in a clockwise direction as viewed from the downstream end. At the downstream end of the cylindrical part 31 is a radially outwardly extending end-piece in the form of a flange 32 which defines at its free edge a first, circular pole 33 (magnetic south) of the inner magnetic yoke. Another end-piece in the form of a radially outwardly extending flange 34 is located at the upstream end of the cylindrical part 31 supports a cylindrical wall 35 which partly encloses the inner coil 16 and defines a second (magnetic north) pole at its free edge 36, as seen best on FIG. 4.

The outer yoke 30B is formed by a cylindrical wall 37 coaxial with the axis X—X and having a circular rim 38 of increased thickness. This rim is divided by four slots or gaps 39 (FIG. 3) serving to divide the rim 38 into four equal sectors 38A, 38B, 38C and 38D. Each of these sectors has a subsidiary, steering, coil wound around it. These steering coils are the same coils as are shown at 18, 18', 19, 19' on FIG. 2 and they are arranged so that current passes clockwise around one and anticlockwise around the opposite coil. A first, radially inwardly extending end-piece, in the form of a flange 40, is attached to the four sectors of the rim 38. This flange 40 is circular and bridges the gaps between the rim sectors 38. It is shown pas. The circular, radially inner, edge of the flange 40 forms a first (magnetic north) pole of the body 30B and is positioned, as is best seen on FIG. 4, slightly downstream of the magnetic south pole 33 of the body 30A. The upstream end of the cylindrical wall 37 extends into another inwardly extending circular flange 41 which in turn extends into a cylindrical wall 42 coaxial with the axis X—X. The walls 37, 41 and 42 define an enclosure which contains a main outer coil 17 (also shown on FIG. 2)

which is wound around the wall 42 and is connected so that current flows in the direction shown in FIG. 4 such as to create a magnetic south pole at the downstream edge 43 of the wall 42 and a magnetic north pole at the inner edge 44 of the flange 40.

FIG. 4 shows the lines of magnetic field when current is passing through the inner coil 16 and the outer coil 17 but not through the steering coils 18, 18', 19 and 19'. It will be seen from FIG. 4 that the offset between the poles 33 and 44 results in the magnetic field being tilted in an annular accelerating zone 45 where, in operation, the ions are accelerated. This tilt of the magnetic field causes the ions to be accelerated in a direction shown by the arrows V towards the axis X—X. The purpose of this is to limit the divergence of the resulting plume of ions from the thruster. A point worth noting is that the cylindrical walls 35 and 42 serve to screen the area 45' where the anode is located from the effects of the magnetic field.

Operation of the illustrated thruster is as follows. Electrons are emitted from the cathode 27 and are divided into two streams. One stream of such electrons is attracted towards the anode 24 into the annular channel 20. The radial component of the magnetic field within the channel causes the electrons to travel in a circumferential direction, gradually drifting in an axial direction towards the anode. In the region 45' of the anode, where there is only minimal magneticring their spiral movement down the channel, cause ionization of the propellant gas supplied along the pipe 25.

The resulting ions, which are positively charged, are accelerated in a downstream direction by an electric field produced by a potential difference of about 300 volts, between anode and cathode. Because of their relatively high mass, as compared with the mass of electrons, the propellant ions are not greatly influenced by the magnetic field. There is however some such influence and the inclined nature of the magnetic field in the accelerating region 45 between poles 33 and 44 causes the stream of ions, issuing from the downstream end of the thruster, to tend to converge in the direction indicated by the letter V. When a current is passed through the coils 18, 18', the effect of the magnetic field on the ions issuing from one side of the thruster is increased because the magnetic field strength there is increased, whilst the effect is decreased on the opposite side of the thruster. Thus a deflection in the direction of the vector is achieved as shown at V' and V' on FIG. 4. By controlling the currents through coils 18, 18' on the one hand and 19, 19' on the other hand, the direction of thrust can be displaced in any direction.

It was mentioned earlier that the electrons emitted from the cathode 27 were divided into two streams and that one of these streams entered the accelerating channel. The other stream of electrons is effective to neutralize the ions as they are ejected from the thruster so as to avoid leaving a resultant negative charge on the thruster. Erosion of the downstream edge of the outer ceramic wall 22, caused by steering of the thrust vector, is reduced by the presence of the chamfer 22a, whilst reduction in erosion of the corresponding edge of the inner wall 21 is reduced by its displacement in the upstream direction relative to the corresponding chamfered edge of the outer wall 22.

An important feature tic bodies 30a and 30b are magnetically separate, each constituting an individual electromagnet having its own north and south poles. Because of this, it is possible to obtain the required magnetic characteristics within the accelerating channel with a wide variety of different overall dimensions of the magnetic system, different from those dimensions shown in FIGS. 3 and 4. For example, it is predicted that it will now be possible to manufacture Hall effect thrusters which, for a given power, are shorter in the axial direction and wider in diameter (or vice versa). A thruster can therefore now be designed which makes better use of available space on a satellite or in the launching vehicle.

Figure 5:
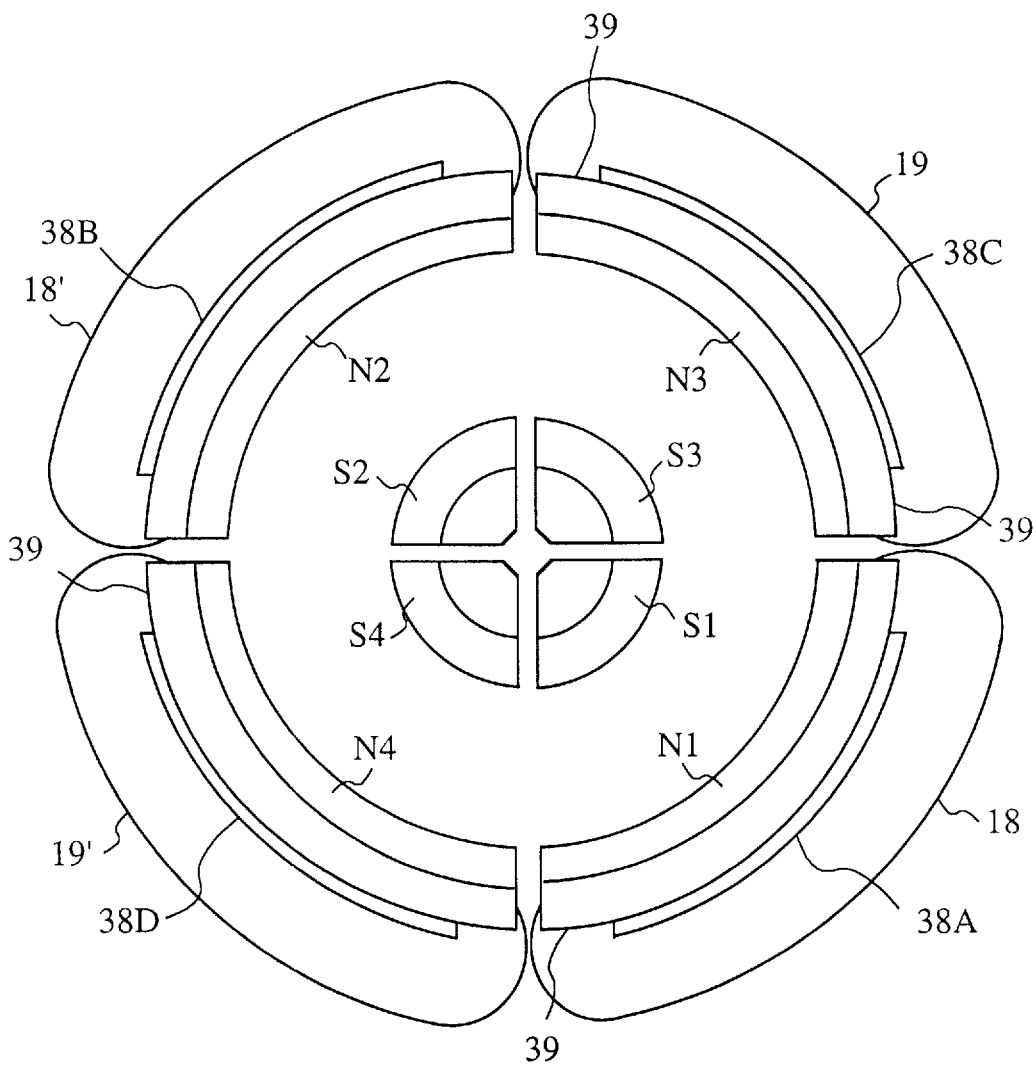
FIG. 5 is a plan view of the components shown in FIG. 4 but showing a design variation in which the magnetic poles are divided into four separate parts.

In the design variation shown in FIG. 5 the magnetic body 30A defining the inner magnetic south pole is divided by radial slots into four segments S1, S2, S3 and S4; and the circular flange 40 defining the outer magnetic north pole is similarly divided into four segments N1, N2, N3 and N4. The slots or gaps between the thus formed individual north poles is notably smaller than the much larger slots or gaps 39 which accommodate the steering coils 18, 18', 19, 19'. The individual north poles thus overlap end portions of the coils where they pass through the gaps. This design variation shown in FIG. 5 provides improved steering capability.

It will be appreciated that the particular embodiment of the invention shown in the drawings has been described only by way of example and that the invention is in no way limited to particular features of this example. For example, the invention is also applicable to the so-called anode layer thruster. Where a construction similar to that illustrated is used, various variations of design would be possible. For example, the steering effect could be improved by dividing the flange 40 into four separate sectors corresponding with the sectors 38a, 38b, 38c and 38d, thereby forming four separate main magnetic north poles. Another on the outside, rather than the inside, of the cylindrical magnetic wall 37. Another possible variation would be to omit the coil 17 and to use, instead, larger coils 18, 18', 19, 19'. Also, either or both of the coils 16 and 17 could of course be replaced by permanent magnets. Alternatively the magnetic bodies 30A and 30B could be formed as permanent magnets. Yet another possible variation would be to have just three steering coils, or any number greater than four.

That which is claimed is:

1. A Hall effect plasma accelerator comprising a substantially annular accelerating channel having closed and open ends, and bodies of magnetic material on opposite sides of the channel, where each magnetic body of the bodies of magnetic material defines a pair of magnetic poles and is both physically and substantially magnetically separate from any other body of magnetic material of the bodies of magnetic material, for creating a magnetic field in the channel.

2. The accelerator according to claim 1 wherein the bodies of magnetic material comprise an outer magnetic body having a cylindrical wall portion coaxial with the accelerator axis, a first end-piece at a downstream end of the cylindrical wall portion and defining a first magnetic pole, and a second end-piece extending radially inwardly from the cylindrical wall portion and then axially downstream so as to define a second pole spaced between the upstream and downstream ends of the channel.

3. The accelerator according to claim 2 wherein the outer magnetic body further comprises a first magnetic source surrounding a cylindrical part of the second end-piece, which part extends axially downstream; and located between that cylindrical part and the cylindrical wall portion.

4. The accelerator according to claim 3 wherein the first magnetic source is a coil.

5. The accelerator according to claim 3 wherein the first magnetic source is a permanent magnet.

6. The accelerator according to claim 1 wherein the bodies of magnetic material comprise an inner magnetic body which is generally spool-shaped and which has: a central part extending in an axial direction; a first end-piece at a downstream end of the central part and extending radially outwardly towards the channel to form a first magnetic pole; a second end-piece extending radially outwardly from an upstream end of the central part; and a cylindrical wall extending from the second end-piece in the downstream direction and terminating in a second magnetic pole.

7. The accelerator according to claim 6 wherein the inner magnetic body comprises a second magnetic source surrounding the central part of the inner magnetic body.

8. The accelerator according to claim 7 wherein the second magnetic source is a coil.

9. The accelerator according to claim 7 wherein the second magnetic source is a permanent magnet.

10. The accelerator according to claims 6, 7, 8 or 9 wherein the bodies of magnetic material further comprise an outer magnetic body having a cylindrical wall portion coaxial with the accelerator axis, a first end-piece at a downstream end of the cylindrical wall portion and defining a first magnetic pole opposite the corresponding first magnetic pole of the inner magnetic body, and a second end-piece extending radially inwardly from the cylindrical wall portion and then axially downstream so as to define a second pole spaced between the upstream and downstream ends of the channel.

11. The accelerator according to claim 10 wherein the outer magnetic body comprises a first magnetic source surrounding a cylindrical part of the second end-piece, which part extends axially downstream; and located between that cylindrical part and the cylindrical wall portion.

12. The accelerator according to claim 11 wherein the first magnetic source is a coil.

13. The accelerator according to claim 11 wherein the first magnetic source is a permanent magnet.

\* \* \* \* \*

UNITED STATES PATENT AND TRADEMARK OFFICE
CERTIFICATE OF CORRECTION

PATENT NO. : 5,847,493
DATED : December 8, 1998
INVENTOR(S) : Y.M. Yashnov et al.

It is certified that error appears in the above-indentified patent and that said Letters Patent is hereby corrected as shown below:

```
Column 1, line 38, after "channel" insert a period --.--.
Column 1, line 39, before "are" insert -- Ions that --.
Column 1, line 39, after "cathode" delete "that".
Column 3, line 60, after "The" delete "he".
Column 3, line 61, after "18'" delete "and".
Column 4, line 35, "purposes" should be -- purpose --.
Column 4, line 59, delete "It is shown pas."
Column 5, line 27, "magneticring their" should be --magnetic
                   field, the electrons'--.
Column 5, line 27, "channel, cause" should be --channel causes--
Column 5, line 46, "V' and V'" should be -- V' and V" --.
Column 5, line 62, "tic" should be -- is that magnetic --.
Column 5, line 62, "30a and 30b" should be -- 30A and 30B --.
```

Signed and Sealed this

Twenty-fifth Day of May, 1999

Attest:

Q. TODD DICKINSON

*Attesting Officer*  *Acting Commissioner of Patents and Trademarks*